(12) United States Patent
Kraft et al.

(10) Patent No.: US 9,797,508 B2
(45) Date of Patent: Oct. 24, 2017

(54) DOUBLE-ACTING SHIFT CYLINDER ACTUATING ASSEMBLY

(71) Applicant: WABCO GmbH, Hannover (DE)

(72) Inventors: Hansjorg Kraft, Hannover (DE); Reiner Krugener, Pattensen (DE); Ingo Meyer, Rehburg-Loccum (DE)

(73) Assignee: WABCO GMBH, Hannover (DE)

( * ) Notice: Subject to any disclaimer, the term of this patent is extended or adjusted under 35 U.S.C. 154(b) by 225 days.

(21) Appl. No.: 14/372,916

(22) PCT Filed: Nov. 28, 2012

(86) PCT No.: PCT/EP2012/004894
§ 371 (c)(1),
(2) Date: Jul. 17, 2014

(87) PCT Pub. No.: WO2013/110302
PCT Pub. Date: Aug. 1, 2013

(65) Prior Publication Data
US 2015/0008350 A1    Jan. 8, 2015

(30) Foreign Application Priority Data
Jan. 23, 2012   (DE) ................. 10 2012 001 100

(51) Int. Cl.
*F16H 63/30*      (2006.01)
*F16H 63/02*      (2006.01)
(Continued)

(52) U.S. Cl.
CPC ......... *F16H 61/30* (2013.01); *F16H 61/0206* (2013.01); *F16H 61/0276* (2013.01);
(Continued)

(58) Field of Classification Search
CPC ...... F16H 61/30; F16H 61/0276; F16K 15/01; F16K 31/0644; F16K 61/0206; Y10T 74/20024
(Continued)

(56) References Cited

U.S. PATENT DOCUMENTS 4,114,516 A     9/1978  Johnson
4,509,716 A *   4/1985  Barber .............. F16K 31/0665
                                                251/129.14
(Continued)

FOREIGN PATENT DOCUMENTS

DE      199 50 443 A1    11/2000
DE      199 31 973        1/2001
(Continued)

*Primary Examiner* — Jessica Cahill
*Assistant Examiner* — Daphne M Barry
(74) *Attorney, Agent, or Firm* — Leydig, Voit & Mayer, Ltd.

(57) ABSTRACT

An assembly for actuating a double-acting shift cylinder of a shift assembly of an automatic transmission of a motor vehicle includes a hydraulic fluid reservoir having a motor-driven hydraulic pump and two control valves that are each connected to a pressure supply line of the hydraulic pump and to a return line to the hydraulic fluid reservoir. The shift cylinder has two pressure chambers that are each connected to one of the control valves. The control valves each connect one pressure chamber of the shift cylinder to the pressure supply line of the hydraulic pump or to the return line to the hydraulic fluid reservoir. The actuating assembly includes at least one pressure-limiting valve that connects the pressure supply line to the return line if a hydraulic over-pressure is present. The control valves can be 3/2-directional valves having integrated pressure-limiting valves.

9 Claims, 3 Drawing Sheets

(51) Int. Cl.
    *F16K 15/18*     (2006.01)
    *F16K 31/06*     (2006.01)
    *F16H 61/30*     (2006.01)
    *F16H 61/02*     (2006.01)

(52) U.S. Cl.
    CPC .......... *F16K 15/18* (2013.01); *F16K 31/0644* (2013.01); *Y10T 74/20024* (2015.01)

(58) Field of Classification Search
    USPC .............. 137/625.2, 625.25, 625.69, 625.67; 251/129.15
    See application file for complete search history.

(56) References Cited

U.S. PATENT DOCUMENTS

| | | | | |
|---|---|---|---|---|
| 5,160,116 | A * | 11/1992 | Sugiura | F16K 31/0665 137/596.17 |
| 5,934,176 | A * | 8/1999 | Mentink | B60J 7/1273 60/368 |
| 7,430,936 | B2 * | 10/2008 | Petzold | F16H 61/28 192/109 F |
| 8,046,122 | B1 | 10/2011 | Barta et al. | |
| 2007/0131883 | A1 | 6/2007 | Goodrich et al. | |

FOREIGN PATENT DOCUMENTS

| | | |
|---|---|---|
| DE | 10 2005 015 481 A1 | 10/2006 |
| DE | 10 2006 031 380 A1 | 1/2008 |
| DE | 10 2006 058 912 | 6/2008 |
| DE | 10 2006 058 913 | 6/2008 |
| DE | 10 2007 029 358 | 1/2009 |
| EP | 1 241 387 A1 | 9/2002 |

* cited by examiner

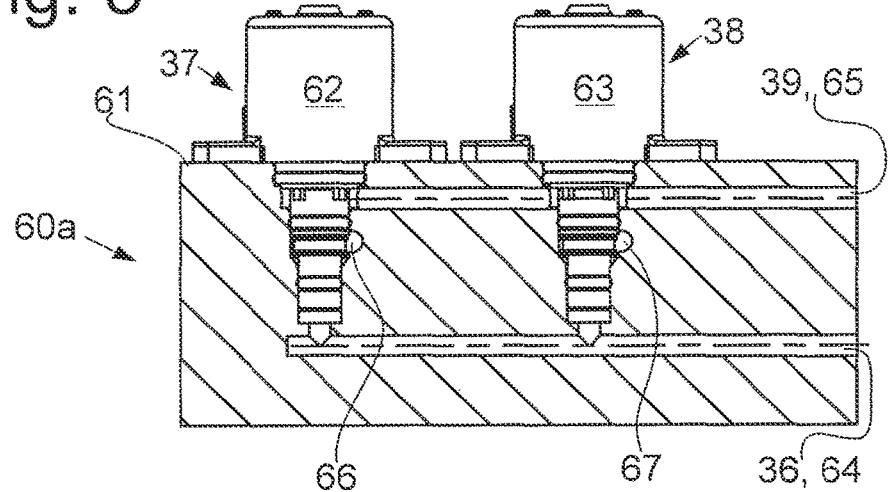
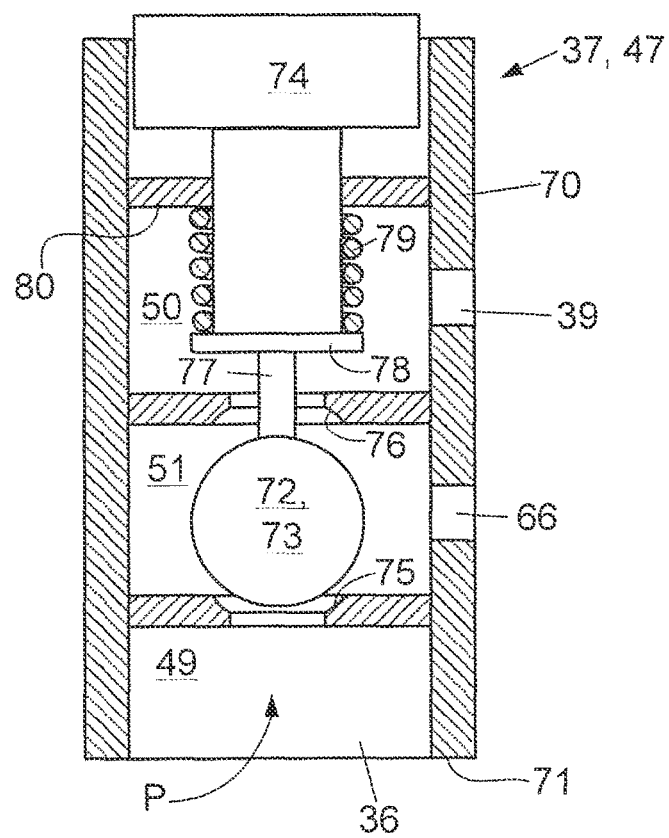

DOUBLE-ACTING SHIFT CYLINDER ACTUATING ASSEMBLY

FIELD OF THE INVENTION

The invention generally relates to actuating a double-acting shift cylinder of a shift assembly of an automatic transmission of a motor vehicle.

BACKGROUND OF THE INVENTION

Automatic transmissions of motor vehicles, especially of commercial vehicles, generally have assemblies consisting of subassemblies, which can be handled individually, for actuating at least one double-acting shift cylinder of a shift assembly. Such assemblies are known, for example, from DE 10 2005 015 481 A1 and DE 199 50 443 A1. The assemblies have at least two control valves by which a double-acting shift cylinder can be subjected to pneumatic or hydraulic pressure. A piston rod of a piston of the shift cylinder is generally connected to a shift fork, a shift finger or similar actuating member by means of which a transmission path can be selected as required. Alternating activation of the control valves ensures that one pressure chamber of the shift cylinder is subjected to hydraulic pressure while the other pressure chamber of the shift cylinder is vented; that is, pneumatic or hydraulic, pressure is discharged from that pressure chamber, the hydraulic fluid, in the case of hydraulic systems, being returned to a hydraulic fluid reservoir via a return line.

The shift cylinders are generally configured as double-acting, cylinders in the form of differential cylinders, and accordingly have a piston with two effective areas of different sizes, since only one effective area of the piston is connected to a piston rod.

In the case of hydraulic assemblies, a pressure-limiting valve, which ensures that the pressure supply line is connected to the return line in the event of an overpressure, is generally provided, so that a possibly harmful overpressure is removed from the system. Otherwise, bursting of hydraulic lines or damage to the control valves or the shift cylinder might occur.

Such dangerous overpressure situations can occur if the motor of the hydraulic pump is energized continuously as a result of a mechanical or electronic fault, so that hydraulic fluid is then pumped constantly into the pressure supply line.

It is therefore usual to incorporate a pressure-limiting valve in a corresponding assembly, as is known, for example, from Applicant's DE 199 31 973 A1 and from DE 10 2006 031 380 A1.

An assembly in which a pressure-limiting valve is not provided is known from DE 10 2006 058 913 A1, according to FIG. 1 of that document. Such an assembly offers no protection against hydraulic overpressure.

These conventional assemblies in which pressure-limiting valves are used have proved widely effective in practice. However, the overpressure valve in such constructions is typically designed such that it is shut down in normal operation and is switched only in an extreme exceptional case, so that it can perform its function in an emergency. Such extreme cases in which the system is exposed to an unnaturally high hydraulic pressure are fortunately extremely rare. However, since the corresponding overpressure valves are normally not actuated over several years, it may happen that, when the extreme case occurs, the pressure-limiting valve is no longer operative, which may result from valve elements being no longer movable through corrosive or other influences. This may accordingly lead to unacceptable damage to the system, manifested, for example, in hydraulic lines bursting or the shift cylinder being actuated in the presence of especially high overpressure, whereby a gear is selected or unselected in an unwanted manner, with resulting severe damage to the transmission and the vehicle.

SUMMARY OF THE INVENTION

Generally speaking, it is an object of the present invention to provide an improved, simplified assembly for actuating a double-acting shift cylinder of a shift assembly of an automatic transmission of a motor vehicle that provides a pressure-limiting function under all operating conditions.

This object can be achieved by integrating the function of a pressure-limiting valve in each of the control valves. Unlike conventional constructions, in which simple 2/2-control valves are generally used, the control valves can be 3/2-control valves. Overpressure is therefore reduced via the 3/2-directional control valves, which normally shift the gear or the transmission path in the system. The system is therefore secured directly against bursting by the control valves. The design of the 3/2-directional control valves and their arrangement in the system make it possible for the valves to open the path between pressure line and return line without inadmissibly high pressure being built up in the working cylinder. The working cylinders are thereby prevented from moving and therefore from performing an impermissible shift.

Because the control valves, which can take over the function of an overpressure valve, are switched constantly, seizing-up of the valve bodies is practically ruled out.

Moreover, because the pressure-limiting valve can be dispensed with, the corresponding subassembly can not only be produced at lower cost but can also be made more compact, which is especially advantageous in view of installation space becoming ever more restricted.

In addition, for each of the 3/2-directional control valves, an intermediate position can be provided between a normally closed position for the pressure supply line and an open position for the pressure supply line upon switching of the control valves. In such intermediate position, the pressure supply line is connected to the return line and the 3/2-directional control valve concerned is connected to a working chamber of the shill cylinder.

In other practical embodiments, the shift cylinder may be in the form of a synchronous cylinder with equal effective areas.

In another embodiment of the present invention, the control valve can have, in each case, a valve body with a valve piston arranged therein. The valve piston, in normal operation of the control valve, can be switched by a solenoid from a lower, normally closed position to an upper, closed position, a lower valve seat and an upper valve seat being provided in the valve body by means of which the return line, the pressure supply line and the bore leading to a working chamber of the shift cylinder can be connected to or disconnected from one another; a compression spring acting on the valve piston presses it against the lower valve seat in the unswitched state and under normal pressure conditions.

This configuration may be extended in that the compression spring is set such that, upon attainment of an overpressure, the valve piston is lifted from its lower valve seat such that the return line, the pressure supply line and the bore leading to a working chamber of the shift cylinder are connected to one another.

According to another embodiment, the control valves can each be configured as valve cartridges, which are screwed into bores of a carrier part of a subassembly, and which are each connected to the return line, to the pressure supply line and to bores leading to respective working chambers of the shift cylinder.

This configuration may be further extended in that the return line and the pressure supply line are each configured as a passage bored in the carrier part.

According to a further embodiment, a bore can be formed in the carrier part parallel to the valve cartridges, the passages opening into the bore and the bore being closed releasably by a screw.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

The embodiments of the present invention are described in greater detail below with reference to the accompanying drawings in which:

FIG. 3 shows a subassembly of an assembly in longitudinal section according to another embodiment of the present invention; and FIG. 4 is a partial view of a control valve according to an embodiment of the present invention.

DETAILED DESCRIPTION OF THE PREFERRED EMBODIMENTS

Figure 1:
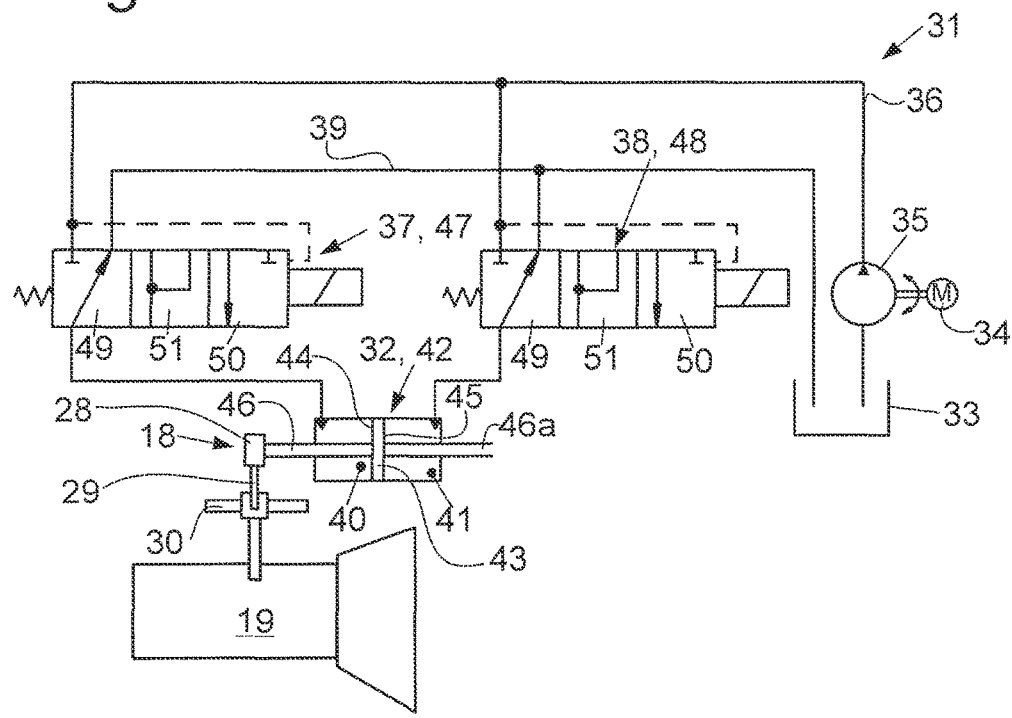
FIG. 1 is a circuit diagram of an assembly according to an embodiment of the present invention.
Figure 1A:
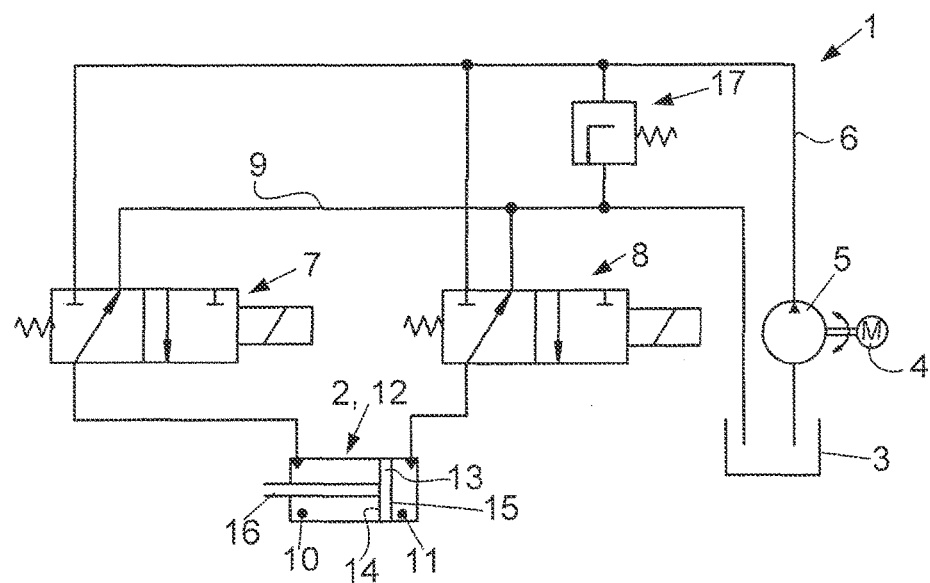
FIG. 1a is a circuit diagram of a prior art assembly.

Referring now to the drawing figures, FIG. 1a shows a conventional assembly 1 for actuating a double-acting shift cylinder 2 of an automatic transmission of a motor vehicle. The assembly 1 comprises a hydraulic fluid reservoir 3 with a hydraulic pump 5 driven by an electric motor 4. A pressure supply line 6 is connected to the hydraulic pump 5. The pressure supply line 6 is connected to respective control valves 7, 8, which are each in the form of 2/2-directional control valves. A return line 9 leading back to the hydraulic fluid reservoir 3 is connected to each of the control valves 7, 8. The control valves 7, 8 are connected to respective working chambers 10, 11 of the shift cylinder 2. The control valves 7, 8, in the form of solenoid valves, are switched alternately in operation, so that one respective working chamber 10, 11 is subjected to hydraulic pressure while the respective other working chamber 11, 10 is depressurized, hydraulic fluid being returned from this working chamber 11, 10 via the return line 9 to the hydraulic fluid reservoir 3.

The shift cylinder 2 according to the prior art is in the form of a differential cylinder 12. Accordingly, it has a piston 13, which has a piston rod 16 on only one side of its piston surfaces 14, 15. The piston rod 16 is connected to an actuating element such as a shift fork.

A pressure-limiting valve 17, which is energized only if the system detects an abnormal overpressure, is arranged between the return line 9 and the pressure supply line 6. In this case, when an abnormal overpressure is present, the pressure supply line and the return line are connected to one another.

Figure 1B:
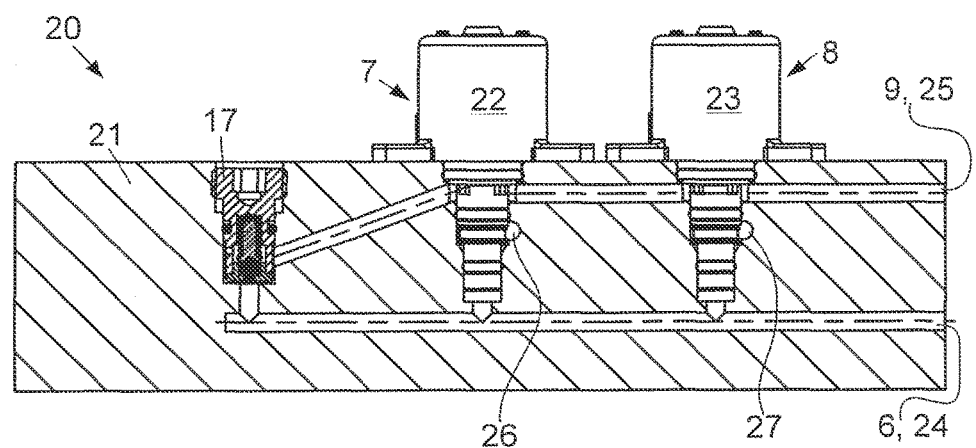
FIG. 1b shows a subassembly of an assembly according to the prior art.

FIG. 1b shows a conventional subassembly 20 of the assembly 1 from FIG. 1a. This subassembly 20 includes only the control valves 7, 8 and the pressure-limiting valve 17; further components of the subassembly 20 include the hydraulic pump, and an electronic unit for activating the control valves 7, 8, which can be mounted on the carrier part 21 and can have an electronics housing.

The control valves 7, 8, in the form of solenoid valve cartridges 22, 23, are screwed into corresponding bores of the carrier part 21. A passage 24 bored in the carrier part 21 forms the pressure supply line 6, while a passage 25 forms the return line 9. The pressure limiting valve 17, which connects the pressure supply line 6 to the return line 9 upon detection of an abnormal overpressure, is also fitted into a corresponding bore.

Bores 26, 27, which form connections to the working chambers 10, 11 of the shift cylinder 2, pass through the carrier part 21 in the region of the control valves 7, 8, transversely to the pressure supply line 6 and to the return line 9, in each case. Upon appropriate switching of the control valves 7, 8, hydraulic fluid is pumped into the bores 26, 27, whereby the working chambers 10, 11 of the shift cylinder 2 are charged with hydraulic fluid.

FIG. 1 is a circuit diagram of an assembly 31 according to an embodiment of the present invention for actuating a double-acting shift cylinder 32 of a shift assembly 18 of an automatic transmission 19 of a motor vehicle, which can be in the form of a commercial vehicle. Like the shift assembly according to the prior art, the shift assembly according to the inventive embodiment comprises a hydraulic fluid reservoir 33 and a hydraulic pump 35 driven by a motor 34. The hydraulic pump 35 is likewise connected to a pressure supply line 36. Two control valves 37, 38 are likewise connected to the pressure supply line 36. The control valves 37, 38 are further connected to a return line 39 via which hydraulic fluid can now back to the hydraulic fluid reservoir 33. The control valves 37, 38 are connected to respective working chambers 40, 41 of the shift cylinder 32 in the form of a synchronous cylinder 42. A piston 43 of the synchronous cylinder 42 has two piston surfaces 44, 45 connected to respective piston rods 46, 46a. One piston rod 46 is connected to an actuating element 28 in the form of a shift fork 29 by which a path 30 of the transmission 19 can be selected.

The assembly 31 according to the inventive embodiment differs from the prior art above all in the configuration of the control valves 37, 38 and in the configuration of the shift cylinder 32 as a synchronous cylinder 42.

The control valves 37, 38 are in the form of 3/2-directional control valves 47, 48. Each of the control valves 37, 38 takes over the function of a pressure-limiting valve. The constructional details in this regard are described in more detail in connection with FIG. 4; to begin with, it is sufficient to note that, in contrast to the known prior art, an intermediate position 51 is provided between the normally closed position 49 for the pressure supply line 36 and the open position 50 for the pressure supply line 36 upon switching of the control valves 37, 38. In this intermediate position 51, the pressure supply line 36 is connected to the return line 39. In normal operation this state occurs only in the event of overpressure. In such a situation, not only are pressure supply line 36 and return line 39 connected to one another but pressure is also directed into the working chambers 40, 41. Normally, as in the prior art, there would here be a danger that, upon pressurization of both working chambers, the piston rod might be moved, since, in the prior art—as explained above—differential cylinders 12 with unequal effective areas are generally used. However, with the shift cylinder 32 preferably used, which is configured as the synchronous cylinder 42, the piston surfaces 44, 45 have the same effective area. If both working chambers 40, 41 are now subjected to hydraulic pressure, because of the equal effective areas, the piston 43 of the synchronous cylinder 42 will remain in a middle, neutral position, ensuring that the actuating element 28 cannot be displaced to a position in which a path 30 could be selected.

Figure 2:
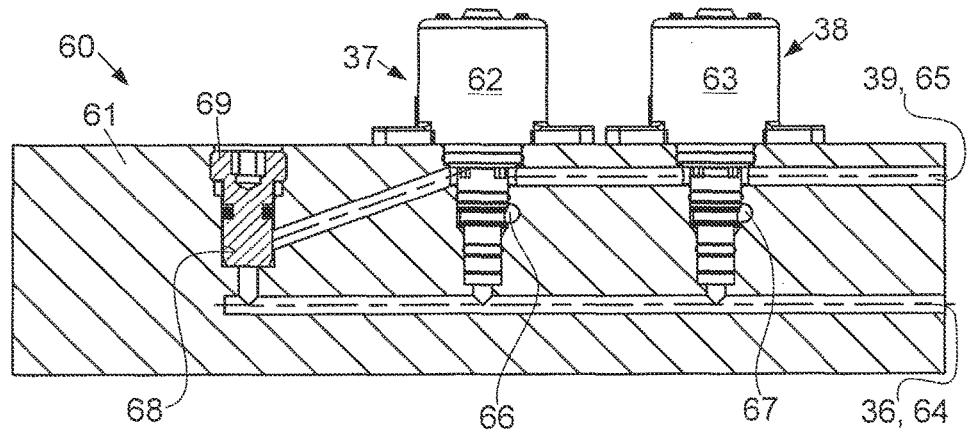
FIG. 2 shows a subassembly of an assembly in longitudinal section according to an embodiment of the present invention.

With regard to construction, two exemplary embodiments of the assembly 3 according to the present invention are represented in FIGS. 2 and 3.

A first exemplary embodiment of a subassembly 60 of the assembly 31 is represented in FIG. 2. This corresponds very extensively to the subassembly 20 according to the prior art as shown in FIG. 1b. Accordingly, the subassembly 60 has a carrier part 61. Likewise, control valves 37, 38 in the form of solenoid valve cartridges 62, 63 are inserted in bores. The pressure supply line 36 and the return line 39 formed as the passages 64, 65, and the transversely disposed bores 66, 67 forming the connections of the control valves 37, 38 to the working chambers 40, 41 of the shift cylinder 32, are also the same. Also present is a bore 68, into which, however, a pressure-limiting valve 17 is not inserted, as in the prior art according to FIG. 1b. Rather, a simple screw 69 or the like can be provided for servicing purposes. For repairs to the transmission 19 or to the subassembly 60, it may be desirable to depressurize the system, to exchange hydraulic fluid or to gain access to the hydraulic bores for other purposes. In this case the screw 69 is simply removed and the system depressurized.

FIG. 3 shows a further exemplary embodiment of a subassembly 60a of the assembly 31. This subassembly 60a has all the components of the subassembly 60 from FIG. 2, so that what was said in connection with FIG. 2 applies here too. Only the bore 68 and the screw 69 inserted therein have been omitted from this exemplary embodiment, so that an especially compact subassembly 60a is produced.

FIG. 4 shows schematically the internal, and here fundamental, structure of one of the control valves 37. The control valve 38, not shown in FIG. 4, has a corresponding structure.

The control valve 37 has a substantially cylindrical valve body 70, represented only partially in FIG. 4. Hydraulic fluid flows from the passage 64 of the pressure supply line 36 through a lower end 71 of the valve body 70 into the valve body 70 of the control valve 37, as indicated by the arrow P. A valve piston 72 in the form of a ball 73 can be switched by a solenoid 74 from a lower, normally closed position 49 to an upper, closed position 50 in normal operation of the control valve 37. Accordingly, there are provided a lower valve seat 75 and an upper valve seat 76 by which the return line 39, the pressure supply line 36 and the bore 66 leading to the working chamber 40 of the synchronous cylinder 42 can be connected to and disconnected from one another.

The valve body 72 is connected via a piston rod 77 to a disk 78 against which a compression spring 79 bears, an end of the compression spring 79 opposite the disk 78 bearing against a spring disk 80. The spring disk 80 is rigidly connected to the valve body 70. The compression spring 79 ensures that the ball 73 of the valve piston 72 is pressed firmly against the valve seat 75 when the solenoid 74 is switched off, and therefore closes the supply line 66 to the working chamber 40 of the synchronous cylinder 42. If an electromagnetic coil of the solenoid 74 is suitably energized, the valve piston 72 is pulled against the resistance of the compression spring 79 and is placed firmly against the valve seat 76, whereby the supply line 66 to the working chamber 40 of the synchronous cylinder 42 is opened and the return line 39 is closed.

In accordance with the two normal switching positions, the closed position 49 and the open position 50 are brought about in the corresponding working chambers of the valve body 70.

The components of the control valve 37 are designed for a normal operating pressure of approximately 80 bar. The compression spring 79 is set such that it works under normal pressure and under the afore-described conditions and ensures either the closed or the open position of the control valve 37. However, unlike normal 2/2-directional control valves, the compression spring 79 is tuned such that that it no longer fully maintains the closed position 49 at an overpressure of an order of magnitude above approximately 100 bar. At a corresponding pressure P on the ball 73, the ball 73 is lifted slightly from the valve seat 75 against the compression spring 79 so that hydraulic fluid can flow via the valve seat 75 and via the valve seat 76 in each case to the return line 39 and into the line 66 to the working chamber 40 of the synchronous cylinder 42. This middle position 51 is represented in FIG. 4; in this case all the connections 36, 39, 66 are connected to one another.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, night be said to fall therebetween.

What is claimed is:

1. An actuating assembly for a double-acting shift cylinder of a shift assembly of an automatic transmission of a motor vehicle, the actuating assembly comprising:
   a hydraulic fluid reservoir;
   a hydraulic pump;
   a first 3/2-directional control valve and a second 3/2-directional control valve;
   a pressure supply line that connects the hydraulic pump to a first port of the first 3/2-directional control valve and to a first port of the second 3/2-directional control valve;
   a return line that connects a second port of the first 3/2-directional control valve and a second port of the second 3/2-directional control valve to the hydraulic fluid reservoir;
   a first connecting line that connects a third port of the first 3/2-directional control valve to a first working chamber of the double-acting shift cylinder of the shift assembly of the automatic transmission of the motor vehicle; and
   a second connecting line that connects a third port of the second 3/2-directional control valve a second working chamber of the double-acting shift cylinder of the shift assembly of the automatic transmission of the motor vehicle, wherein the first 3/2-directional control valve is configured to fluidly connect the pressure supply line to the first connecting line in a first position, to fluidly connect the return line to the first connecting line in a second position, and to fluidly connect, in a third position, its respective first and second ports so as to fluidly connect the pressure supply line to the return line in the presence of a hydraulic overpressure, and wherein the second 3/2-directional control valve is configured to fluidly connect the pressure supply line to the second connecting line in a first position, to fluidly connect the return line to the second connecting line in a second position, and to fluidly connect, in a third position, its respective first and second ports so as to fluidly connect the pressure supply line to the return line in the presence of a hydraulic overpressure.

2. The actuating assembly as claimed in claim 1, wherein for each of the 3/2-directional control valves, the third position is a middle position between the first position and the second position.

3. The actuating assembly as claimed in claim 2, wherein each of the 3/2-directional control valves comprises:
- a valve closure element connected to a valve piston;
- a compression spring;
- a first valve seat; and
- a second valve seat;
- wherein the compression spring is configured to exert a force on the valve piston so as to press the valve closure element against the first valve seat so as to seal the first port of the respective 3/2-directional control valve.

4. The actuating assembly as claimed in claim 3, wherein in response to an overpressure on the valve closure element, the compression spring is configured to cause the valve closure element to lift from the first valve seat so as to connect the first and second ports of the respective 3/2-directional control valve.

5. The actuating assembly as claimed in claim 1, wherein the shift cylinder is a synchronous cylinder having substantially equal effective areas.

6. The actuating assembly as claimed in claim 1, wherein each of the 3/2-directional control valves are valve cartridges affixed in bores of a carrier part of a subassembly, each of the valve cartridges being connected to the return line, to the pressure supply line, and to bores leading to the associated working chambers of the shift cylinder.

7. The actuating assembly as claimed in claim 6, wherein the return line and the pressure supply line are passages defined in the carrier part.

8. The actuating assembly as claimed in claim 7, further comprising a servicing bore defined in the carrier part substantially parallel to the valve cartridges,
wherein the passages defined in the carrier part open into the servicing bore.

9. The actuating assembly as claimed in claim 8, wherein the servicing bore is configured to be releasably closed by a screw.

* * * * *